US012656896B2

(12) United States Patent
Zhang

(10) Patent No.: US 12,656,896 B2
(45) Date of Patent: Jun. 16, 2026

(54) DISPLAY TOUCH ASSEMBLY AND DISPLAY APPARATUS

(71) Applicant: HUAWEI TECHNOLOGIES CO., LTD., Shenzhen (CN)

(72) Inventor: Junyong Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/903,576

(22) Filed: Oct. 1, 2024

(65) Prior Publication Data

US 2025/0021181 A1      Jan. 16, 2025

Related U.S. Application Data

(63) Continuation of application No. PCT/CN2023/086795, filed on Apr. 7, 2023.

(30) Foreign Application Priority Data

Apr. 15, 2022    (CN) ......................... 202210397560.X

(51) Int. Cl.
*G06F 3/041* (2006.01)

(52) U.S. Cl.
CPC ................................ *G06F 3/04144* (2019.05)

(58) Field of Classification Search
CPC ....... G06F 3/04144; G06F 2203/04112; G06F 3/04164; G06F 3/0443; G06F 3/0446; G06F 3/0412
See application file for complete search history.

(56) References Cited

U.S. PATENT DOCUMENTS

| | | | | |
|---|---|---|---|---|
| 10,887,437 | B2 * | 1/2021 | Ye | G06F 1/1643 |
| 11,829,545 | B2 * | 11/2023 | Xu | H10K 59/40 |
| 11,989,368 | B2 * | 5/2024 | Li | G06F 3/0446 |
| 2019/0265824 | A1 * | 8/2019 | Abe | G06F 3/0412 |

(Continued)

FOREIGN PATENT DOCUMENTS

| | | |
|---|---|---|
| CN | 109639853 A | 4/2019 |
| CN | 111665998 A | 9/2020 |

OTHER PUBLICATIONS

Extended European Search Report in European Appln. No. 23787585.1, mailed on May 20, 2025, 9 pages.

(Continued)

*Primary Examiner* — Ibrahim A Khan
(74) *Attorney, Agent, or Firm* — Fish & Richardson P.C.

(57) ABSTRACT

Embodiments of this application provide a display touch assembly and a display apparatus. In an implementation, the display touch assembly includes a plurality of electrode blocks, a plurality of touch leads, and a plurality of pads. The electrode blocks include a first electrode block and a second electrode block. A plurality of first electrode blocks are arranged in a first direction to form a first touch electrode. A plurality of second electrode blocks are arranged in a second direction to form a second touch electrode. An end of the first touch electrode in the first direction is coupled to a first touch lead. An end of the second touch electrode in the second direction is coupled to a second touch lead. The plurality of electrode blocks are located in a display region. The plurality of pads are located in a non-display region. The display region includes a first corner.

20 Claims, 9 Drawing Sheets

(56) References Cited

U.S. PATENT DOCUMENTS

| | | | |
|---|---|---|---|
| 2020/0064972 A1* | 2/2020 | Yen | G06F 3/04164 |
| 2020/0186631 A1* | 6/2020 | Ye | G06F 1/1643 |
| 2020/0310180 A1* | 10/2020 | Fu | G02F 1/13439 |
| 2021/0271367 A1* | 9/2021 | Park | G06F 3/04164 |
| 2021/0318770 A1* | 10/2021 | Joo | G06F 3/0412 |
| 2022/0083162 A1* | 3/2022 | Xu | G06F 3/0446 |
| 2023/0157054 A1* | 5/2023 | Na | G06F 3/0412 |
| | | | 257/40 |
| 2023/0168757 A1* | 6/2023 | Wu | G06F 3/041 |
| | | | 345/174 |

OTHER PUBLICATIONS

International Search Report and Written Opinion in International Appln. No. PCT/CN2023/086795, mailed on Jun. 6, 2023, 13 pages (with English Translation).

* cited by examiner

0001

DISPLAY TOUCH ASSEMBLY AND DISPLAY APPARATUS

CROSS-REFERENCE TO RELATED APPLICATIONS

This application is a continuation of International Application No. PCT/CN2023/086795, filed on Apr. 7, 2023, which claims priority to Chinese Patent Application No. 202210397560.X, filed on Apr. 15, 2022. The disclosures of the aforementioned applications are hereby incorporated by reference in their entireties.

TECHNICAL FIELD

This application relates to the field of display technologies, and more specifically, to a display touch assembly and a display apparatus.

BACKGROUND

Currently, mature touch technologies include capacitive touch, infrared touch, resistive touch, and the like. The capacitive touch is widely applied to the display field due to an advantage of capable of implementing multi-touch by the capacitive touch. For application on different displays, the capacitive touch technology further includes an add-on solution, an in-cell solution, and the like. To implement a touch function, a touch electrode located in a display region needs to be connected to a touch driver chip in a non-display region through a touch lead. As a result, a large quantity of touch leads are arranged in the non-display region. This is not conducive to narrowing of a display frame.

SUMMARY

In view of this, this application provides a display touch assembly and a display apparatus, to resolve a problem of frame narrowing caused by a large quantity of touch leads arranged in a non-display region in a conventional technology.

According to a first aspect, an embodiment of this application provides a display touch assembly, where the display touch assembly includes:

a plurality of electrode blocks arranged in an array, where the electrode blocks include a first electrode block and a second electrode block, a plurality of first electrode blocks are arranged in a first direction to form a first touch electrode, a plurality of first touch electrodes are arranged in a second direction, the second direction intersects the first direction, adjacent first electrode blocks are coupled through a first connection part, a plurality of second electrode blocks are arranged in the second direction to form a second touch electrode, a plurality of second touch electrodes are arranged in the first direction, adjacent second electrode blocks are coupled through a second connection part, and the second connection part intersects the first connection part in an insulated manner; and a plurality of touch leads and a plurality of pads, where in the first direction, the plurality of pads are located on a side of the plurality of electrode blocks, the touch leads are coupled to the pads, the touch leads include a first touch lead and a second touch lead, an end of the first touch electrode in the first direction is coupled to the first touch lead, and an end of the second touch electrode in the second direction is coupled to the second touch lead; where the display touch assembly includes a display region and a non-display region, the plurality of electrode blocks are located in the display region, the plurality of pads are located in the non-display region, the display region includes a first corner, and the first corner is located at an end that is of the display region and that is close to the pad; and the display region includes a routing region adjacent to the first corner, at least one signal line is disposed in the routing region, a routing direction of the signal line intersects the first direction, and the signal line includes a partial line segment of at least one touch lead.

In this embodiment of this application, the routing region is disposed in the display region, and the routing region is adjacent to the first corner on a side that is of the display region and that is close to the pad. In this case, the routing region is adjacent to a first non-display region in which the pad is located. The signal line in the routing region includes the partial line segment of the at least one touch lead, and the partial line segment of the touch lead that originally needs to be routed in the first non-display region is disposed in the display region, so that space occupied by the touch lead in the first non-display region can be reduced. This facilitates narrowing of a frame.

In some embodiments, the signal line includes a first signal line, the first signal line is a partial line segment of the first touch lead, the first signal line includes two endpoints, one endpoint is coupled to the first touch electrode in the display region, and the other endpoint is coupled to the pad; and/or the signal line includes a second signal line, the second signal line is a partial line segment of the second touch lead, the second signal line includes two endpoints, one endpoint is coupled to the second touch electrode, and the other endpoint is coupled to the pad.

In some embodiments, the signal line includes the first signal line and the second signal line; and the signal line further includes at least one shielding line, and the shielding line is located between the first signal line and the second signal line. The shielding line is configured to shield a signal, to prevent signal interference between the first signal line and the second signal line, and ensure accuracy of touch detection.

In some embodiments, the signal line overlaps with neither the first touch electrode nor the second touch electrode. In this embodiment of this application, partial space in which the electrode block is disposed in the display region is occupied to dispose the signal line. In this way, the partial line segment of the at least one touch lead can be disposed in the display region, to reduce space occupied by the touch lead in the first non-display region. In addition, the electrode block and the signal line that are located in the display region can be basically located in a same horizontal plane, to ensure flatness of a film layer at which the touch electrode is located. In addition, in this application, the routing region is adjacent to a corner of the display region, and the routing region occupies only small partial space at an edge corner of the display region. Therefore, overall touch performance of the display region is slightly affected.

In some embodiments, the display touch assembly further includes a substrate and a display layer, both the electrode block and the signal line are located on a side that is of the display layer and that is away from the substrate, and the display layer includes a plurality of pixels; and an orthographic projection of the signal line onto the display layer is located between adjacent pixels. The signal line disposed in the display region does not block light output of the pixel.

In some embodiments, the signal line is a polyline, and a corner of the signal line is located in a virtual quadrilateral formed by four adjacent pixels. In this implementation, the signal line is disposed as a polyline in a pixel arrangement manner, so that the signal line is routed between adjacent pixels, preventing the signal line from blocking light output of the pixel.

In some embodiments, the signal line includes a first line segment and a second line segment, the first line segment and the second line segment are connected to each other to form the corner, at least a part of corners of the signal line have a first protrusion part and a second protrusion part, the first protrusion part protrudes from the corner in a direction away from the first line segment, and the second protrusion part protrudes from the corner in a direction away from the second line segment. This implementation is equivalent to forming the signal line after the grid-shaped electrode block in the display region is partially cut off. An overall pattern rule formed by the signal line in the routing region is the same as a rule of the grid-shaped electrode block. Therefore, a reflection status of ambient light in the routing region is basically the same as a reflection status of ambient light at the position of the electrode block, and the routing region is unlikely to be observed by human eyes. This ensures display uniformity of the display region of the display touch assembly.

In some embodiments, for two adjacent signal lines, one signal line includes a second corner, the other signal line includes a third corner, and the second corner and the third corner are adjacent and located in a same virtual quadrilateral. In this implementation, arrangement density of the signal line can be increased, and when a quantity of signal lines is fixed, an area of the display region occupied by the routing region can be reduced, so that impact of a disposition of the routing region on the touch electrode array in the display region can be reduced.

In some embodiments, a material of the signal line is the same as a material of the electrode block. The signal line in the display region and the electrode block may be manufactured in a same etching process. This adds no new process, and can ensure flatness of the film layer at which the touch electrode is located.

In some embodiments, the display region has an axis of symmetry extending in the first direction; a plurality of signal lines are disposed side by side in the routing region; and the signal line includes two endpoints, and in the second direction, distances from the two endpoints of the signal line to the axis of symmetry are unequal. After being routed in the routing region and led out from the display region, the touch lead enters the first non-display region, and the touch lead enters a position closer to the axis of symmetry when entering the first non-display region. At least a part of the touch leads can be arranged in the routing region, so that the touch lead is led out from the display region and then routed in the second direction to the position of the pad. This can reduce line arrangement space in the first non-display region, and facilitates narrowing of a frame.

In some embodiments, the display touch assembly further includes a substrate and a display layer, both the electrode block and the signal line are located on a side that is of the display layer and that is away from the substrate, and the display layer includes a plurality of pixels; the electrode block includes a plurality of openings; and in a direction perpendicular to a plane in which the substrate is located, the opening overlaps with the pixel. Impedance on the touch electrode can be reduced by using the grid-shaped electrode block. In addition, the following case can be avoided: The touch electrode blocks light output of the pixel P.

Based on a same inventive concept, an embodiment of this application further provides a display apparatus, including the display touch assembly provided in any embodiment of this application.

The display touch assembly and the display apparatus provided in this application have the following beneficial effects: The routing region is disposed in the display region, and the routing region is adjacent to the first corner on a side that is of the display region and that is close to the pad. In this case, the routing region is adjacent to the first non-display region in which the pad is located. The signal line in the routing region includes the partial line segment of the at least one touch lead, and the partial line segment of the touch lead that originally needs to be routed in the first non-display region is disposed in the display region, so that space occupied by the touch lead in the first non-display region can be reduced. This facilitates narrowing of a frame.

DESCRIPTION OF EMBODIMENTS

Figure 1:
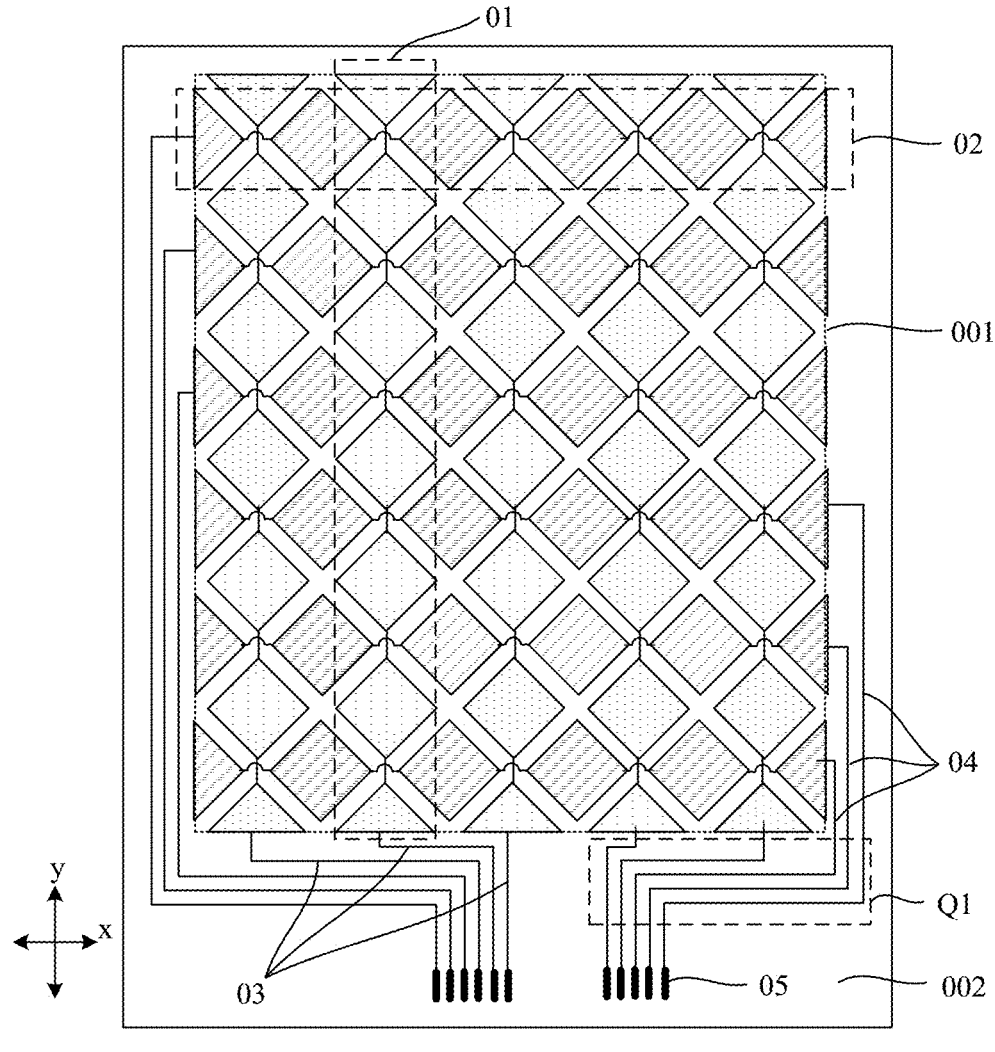
FIG. 1 is a diagram of a top view of a display touch assembly in the conventional technology.

FIG. 1 is a diagram of a top view of a display touch assembly in the conventional technology. As shown in FIG. 1, the display touch assembly includes a first touch electrode 01 extending in a first direction y and a second touch electrode 02 extending in a second direction x. Both the first touch electrode 01 and the second touch electrode 02 are located in a display region 001. Both a first touch lead 03 and a second touch lead 04 are disposed on a periphery of the display region 001. The first touch electrode 01 is coupled to a pad 05 through the first touch lead 03, and the second touch electrode 02 is coupled to the pad 05 through the second touch lead 04. A plurality of pads 05 are located on a side of the display region 001, the first touch lead 03 is led out from a lower side of the display region 001 and connected to a corresponding pad 05, and the second touch lead 04 is led out from the left and right sides of the display region 001, then is routed along the periphery of the display region 001, and extends to a region in which the pad 05 is located and is connected to a corresponding pad 05. In a non-display region 002, the first touch lead 03 and the second touch lead 04 need to converge and extend to positions of the pads 05. As shown in FIG. 1, a routing region Q1 in which the first touch lead 03 and the second touch lead 04 are disposed side by side is surrounded by a dashed line, and an extension direction of a partial line segment of each of the first touch lead 03 and the second touch lead 04 in the routing region Q1 intersects the first direction y. In this case, the routing region Q1 definitely occupies a specific width in the first direction y, affecting narrowing of a width of the non-display region 002.

Figure 2:
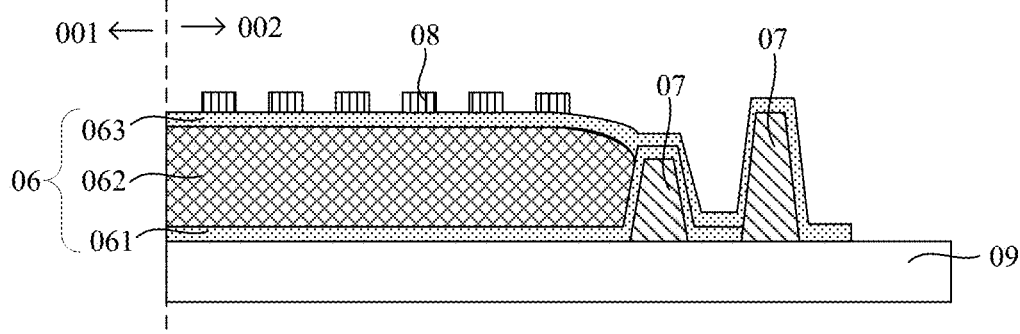
FIG. 2 is a diagram of another display touch assembly in the conventional technology.

In addition, FIG. 2 is a diagram of another display touch assembly in the conventional technology. As shown in FIG. 2, when a touch technology is applied to an organic light-emitting panel, a packaging layer 06 configured to package and protect an organic light-emitting device is disposed in the display touch assembly, and the packaging layer 06 includes a first inorganic layer 061, an organic layer 062, and a second inorganic layer 063. An edge of the packaging layer 06 is located in the non-display region 002, and a packaging baffle wall 07 is disposed in the non-display region 002. A plane in which a substrate 09 is located is used as a reference plane. The great thickness of the organic layer 062 brings a specific height difference between a position of the organic layer 062 and a region outside the organic layer 062. In a photoresist exposure and development process, metal in a lower position is prone to a problem of an etching residue caused by incomplete exposure and development. Therefore, when a touch lead 08 is manufactured by using an etching process, the touch lead 08 (which may be the first touch lead 03 and/or the second touch lead 04) is usually manufactured between the display region 001 and the packaging baffle wall 07. In other words, to ensure a manufacturing yield rate of the touch lead 08, the touch lead 08 can be manufactured only in a small partial region in the non-display region 002. After a quantity of arranged touch leads 08 is determined, further reduction of a size of a display frame is limited.

To resolve a problem existing in the conventional technology, an embodiment of this application provides a display touch assembly. Routing positions of at least a part of touch leads are designed, and the at least a part of the touch leads are routed in a display region, to reduce space occupied by the touch lead in a non-display region, and narrow a frame.

Figure 3:
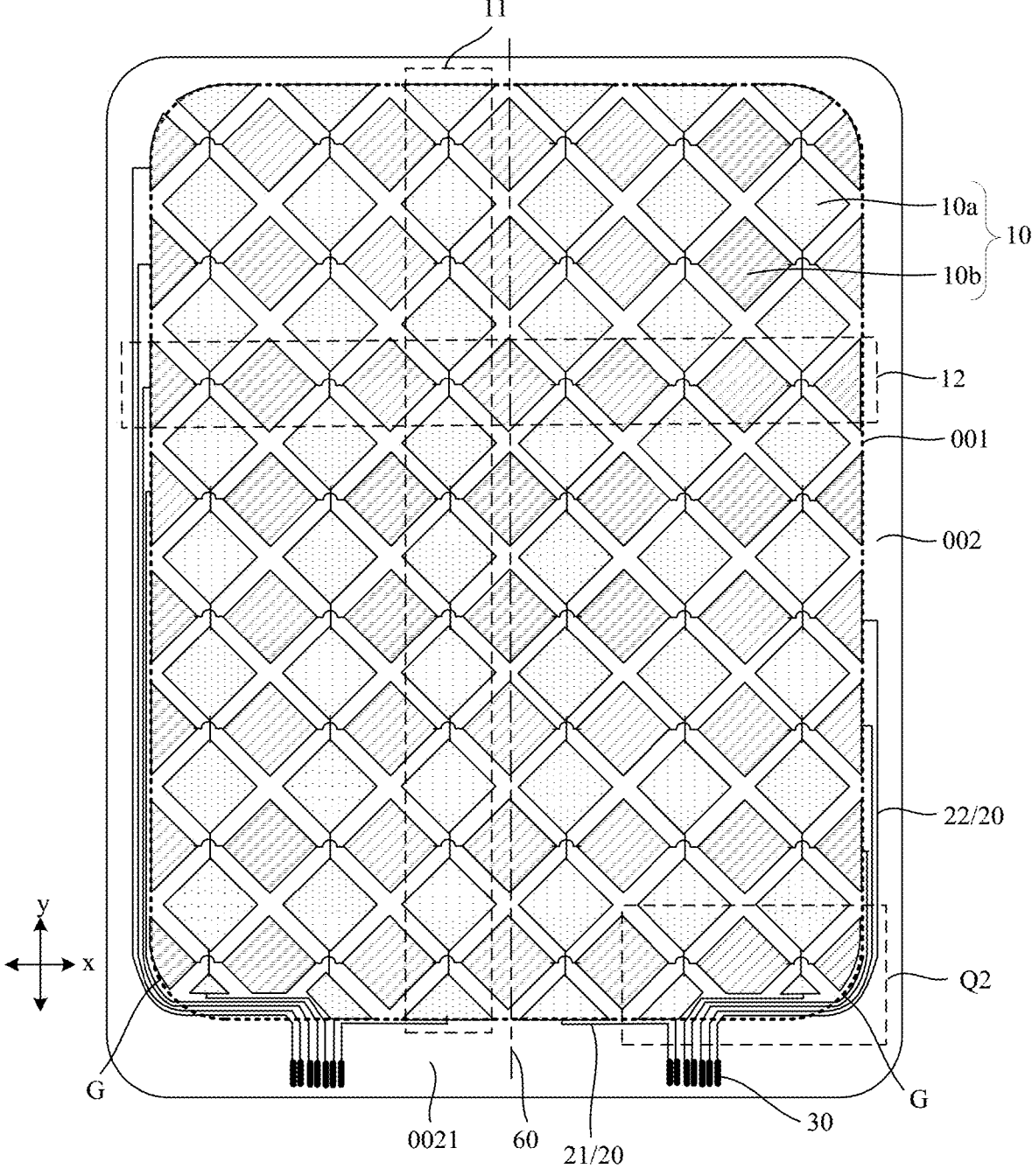
FIG. 3 is a diagram of a display touch assembly according to an embodiment of the present invention.
Figure 4:
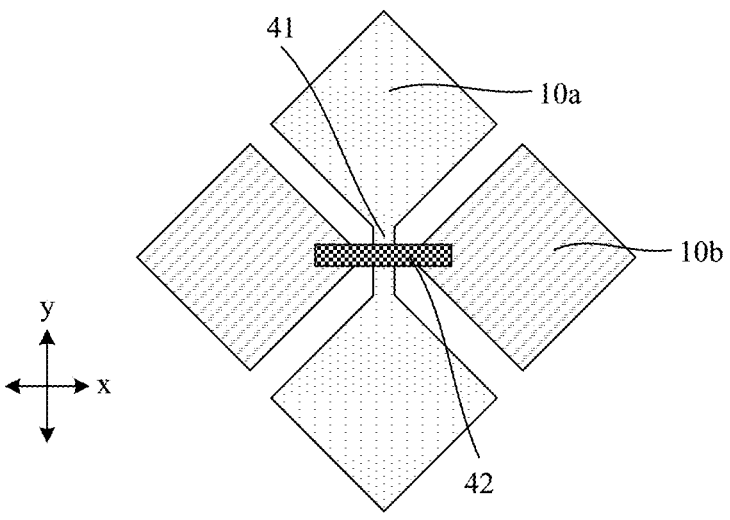
FIG. 4 is a local view of a display touch assembly according to an embodiment of the present invention.
Figure 5:
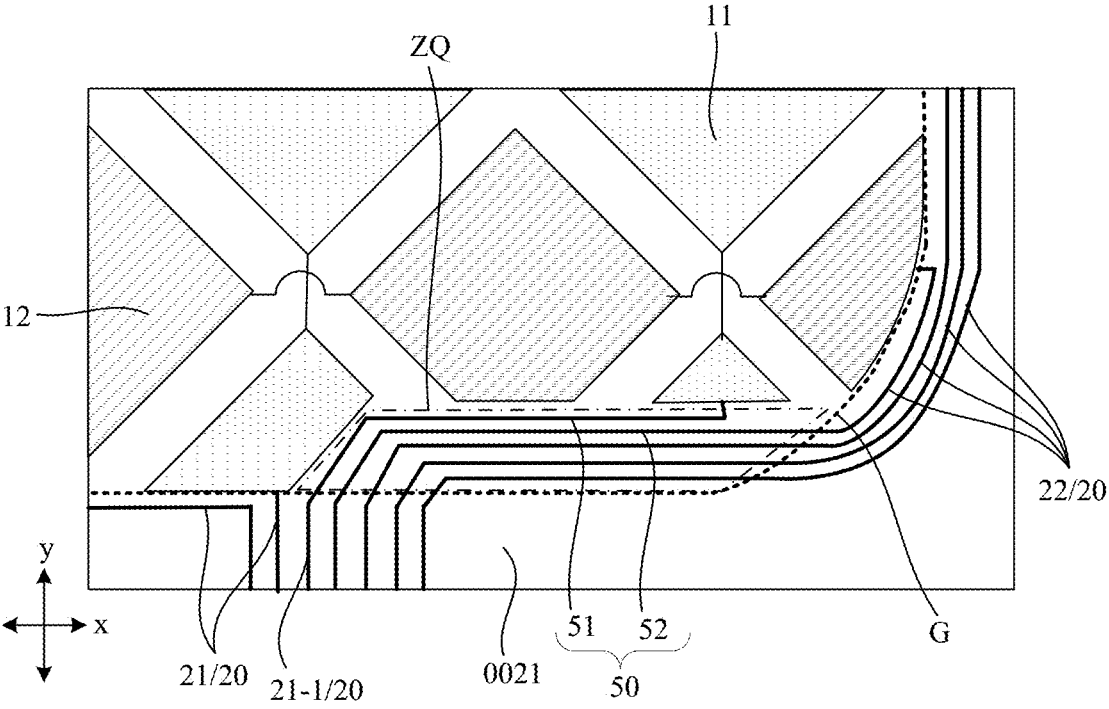
FIG. 5 is an enlarged local view in a region Q2 in FIG. 3.

FIG. 3 is a diagram of a display touch assembly according to an embodiment of the present invention. FIG. 4 is a local view of the display touch assembly according to an embodiment of the present invention. FIG. 5 is an enlarged local view in a region Q2 in FIG. 3.

As shown in FIG. 3, the display touch assembly includes a plurality of electrode blocks 10 arranged in an array, the electrode blocks 10 include a first electrode block 10a and a second electrode block 10b, a plurality of first electrode blocks 10a are connected to each other and arranged in a first direction y to form a first touch electrode 11, a plurality of first touch electrodes 11 are arranged in a second direction x, the second direction x intersects the first direction y, a plurality of second electrode blocks 10b are connected to each other and arranged in the second direction x to form a second touch electrode 12, and a plurality of second touch electrodes 12 are arranged in the first direction y.

As shown in FIG. 4, in the touch electrode, adjacent first electrode blocks 10a are coupled through a first connection part 41, adjacent second electrode blocks 10b are coupled through a second connection part 42, and the second connection part 42 intersects the first connection part 41 in an insulated manner, that is, the second connection part 42 and the first connection part 41 are located at different layers. As shown in FIG. 4, the first connection part 41 and the first electrode block 10a are located at a same layer, that is, the first connection part 41 and the first electrode block 10a are manufactured in a same etching process. In some embodiments, the first electrode block 10a and the second electrode block 10b are manufactured by using a same process at a same layer. In this case, the second connection part 42 and the second electrode block 10b are located at different layers, and the second connection part 42 is connected to the second electrode block 10b through a through hole (not shown in FIG. 4) at an insulation layer. In addition, FIG. 4 shows only one second connection part 42 through which two adjacent second electrode blocks 10b are connected. In some embodiments, two adjacent second electrode blocks 10b may be connected through two or more second connection parts 42. This is not shown in the accompanying drawings herein.

As shown in FIG. 3, the display touch assembly further includes a plurality of touch leads 20 and a plurality of pads 30. In the first direction y, the plurality of pads 30 are located on a side of the plurality of electrode blocks 10, and the touch leads 20 are coupled to the pads 30. The touch leads 20 include a first touch lead 21 and a second touch lead 22. An end of the first touch electrode 11 in the first direction y is coupled to the first touch lead 21, and an end of the second touch electrode 12 in the second direction x is coupled to the second touch lead 22. As shown in FIG. 3, an end that is of each first touch electrode 11 and that is close to the pad 30 in the first direction y is coupled to the first touch lead 21. An end of a part of the second touch electrodes 12 on a left side of the second touch electrodes 12 is coupled to the second touch lead 22, and an end of a part of the second touch electrodes 12 on a right side of the second touch electrodes 12 is coupled to the second touch lead 22. In this embodiment of this application, the touch lead 20 is disposed on a periphery of the touch electrode array including the plurality of electrode blocks 10.

The pad 30 is configured to implement a connection between the two types of touch electrodes and a touch driver chip. In some embodiments, the display touch assembly implements touch detection in a mutual capacitance manner. One of the first touch electrode 11 and the second touch electrode 12 is a touch driver electrode, and the other is a touch sensor electrode. During application, a capacitor is formed between the first electrode block 10a and the second electrode block 10b. The touch driver chip provides a touch driver signal for the touch driver electrode, receives a sensing signal returned by the touch sensor electrode, and determines, based on the sensing signal, a position of a capacitor whose capacitance value changes, to determine a touch position.

In some other embodiments, the display touch assembly implements touch detection in a self-capacitance manner. During application, the first electrode block 10a and the second electrode block 10b each form a capacitor with the ground, and the touch driver chip detects a detection signal returned by each of the first touch electrode 11 and the second touch electrode 12, to determine a change of grounding capacitance of each electrode before and after the touch, and determine a touch position.

The display touch assembly includes a display region 001 and a non-display region 002. It should be noted that the display region 001 is an active display region of the display touch assembly, the active display region can display an image picture, and the non-display region 002 does not have a function of displaying an image picture. Division of the display region 001 and the non-display region 002 in this application is region division performed on the display touch assembly in a thickness direction. When the display touch assembly is of a multi-film-layer stacking structure, the first touch electrode 11, the second touch electrode 12, and the touch lead 20 are all located at a touch layer. The display touch assembly further includes a display layer, the display layer includes a plurality of pixels, and the plurality of pixels are located in the active display region.

The non-display region 002 includes a first non-display region 0021, and in the first direction y, the first non-display region 0021 is located on a side of the display region 001. The plurality of electrode blocks 10 are located in the display region 001, and the plurality of pads 30 are located in the first non-display region 0021. That is, the plurality of pads 30 are located on a side of the display region 001 in the first direction y. The display region 001 includes a first corner G, and the first corner G is located at an end that is of the display region 001 and that is close to the pad 30. As shown in FIG. 3, the display region 001 is in a rectangular shape, edges of the display region 001 in different extension directions are connected through a corner, and the display region 001 in the rectangular shape includes four corners in total. In this embodiment of this application, the first corner G is a corner on a side that is of the display region 001 and that is close to the pad 30, and an end that is of the display region 001 and that is away from the pad 30 further includes two corners. In addition, in FIG. 3, an arc corner is used for illustration of the first corner G. In some other embodiments, the first corner G is a right-angle corner. This is not shown in the accompanying drawings herein.

With reference to FIG. 5, the display region 001 includes a routing region ZQ adjacent to the first corner G, and the routing region ZQ is adjacent to the first non-display region 0021 in which the pad 30 is located. At least one signal line 50 is disposed in the routing region ZQ, a routing direction of the signal line 50 intersects the first direction y, and the signal line 50 includes a partial line segment of at least one touch lead 20. In other words, a partial line segment of the at least one touch lead 20 is disposed in the routing region ZQ for routing. In other words, a partial line segment of the at least one touch lead 20 is located in the active display region. A line shape of the signal line 50 is not limited in this embodiment of this application. The signal line 50 may be a straight line, a curve line, or a polyline, or the signal line 50 is a combination of a straight line segment and a curve line segment. In this embodiment of this application, the routing direction of the signal line 50 is approximately a routing direction of the signal line 50 in the display region 001. The routing direction of the signal line 50 may also be understood that a start point and an end point of the signal line 50 in the display region 001 are connected, and an extension direction of a connection line is the routing direction of the signal line 50.

The display touch assembly provided in this embodiment of this application includes the first touch electrode 11 and the second touch electrode 12 whose extension directions intersect each other, and touch leads 20 respectively connected to the two types of touch electrodes need to be disposed at the periphery of the touch electrode array. In a conventional solution, as shown in FIG. 1, the plurality of touch leads (the first touch lead 03 and the second touch lead 04) located in the non-display region 002 need to be routed along the periphery of the display region 001, and converge in the non-display region 002 in which the pad 05 is located, and then extend to the positions of the pads 05. The touch lead occupies large space between the display region 001 and the pad 05, affecting narrowing of the width of the non-display region 002.

In this embodiment of this application, the routing region ZQ is disposed in the display region 001, and the routing region ZQ is adjacent to the first corner G on the side that is of the display region 001 and that is close to the pad 30. In this case, the routing region ZQ is adjacent to the first non-display region 0021 in which the pad 30 is located. The signal line 50 in the routing region ZQ includes the partial line segment of the at least one touch lead 20, and the partial line segment of the touch lead 20 that originally needs to be routed in the first non-display region 0021 is disposed in the display region 001, so that space occupied by the touch lead 20 in the first non-display region 0021 can be reduced. This facilitates narrowing of a frame.

In some embodiments, as shown in FIG. 5, the signal line 50 in the routing region ZQ overlaps with neither the first touch electrode 11 nor the second touch electrode 12. It is equivalent to that space for manufacturing the signal line 50 in the display region 001 is reserved, and during manufacture of the touch electrode array, the electrode block 10 is disposed to avoid the routing region ZQ. In this embodiment of this application, partial space in which the electrode block 10 is disposed in the display region 001 is occupied to dispose the signal line 50. In this way, the partial line segment of the at least one touch lead 20 can be disposed in the display region 001, to reduce space occupied by the touch lead 20 in the first non-display region 0021. In addition, the electrode block 10 and the signal line 50 that are located in the display region 001 can be basically located in a same horizontal plane, to ensure flatness of a film layer at which the touch electrode is located. In addition, in this application, the routing region ZQ is adjacent to a corner of the display region 001, and the routing region ZQ occupies only small partial space at an edge corner of the display region 001. Therefore, overall touch performance of the display region 001 is slightly affected.

As shown in FIG. 3, the display region 001 has an axis of symmetry 60 extending in the first direction y. From a perspective of an outer contour shape of the display region 001, the display region 001 is symmetric about the axis of symmetry 60. The signal line 50 includes two endpoints. One endpoint is a start point of the signal line 50 in the display region 001, and the other endpoint is an end point of the signal line 50 in the display region 001. In the second direction x, distances from the two endpoints of the signal line 50 to the axis of symmetry 60 are unequal. That is, one endpoint of the signal line 50 is close to the axis of symmetry 60, and the other endpoint is far from the axis of symmetry 60. It can be learned that the signal line 50 is routed in the display region 001. From a perspective of using an end that is in the second direction x and that is away from the axis of symmetry 60 as a start point, the signal line 50 extends in a direction gradually close to the axis of symmetry 60. The signal line 50 includes the partial line segment of the at least one touch lead 20. After being routed in the routing region ZQ and led out from the display region 001, the touch lead 20 enters the first non-display region 0021, and the touch lead 20 enters a position closer to the axis of symmetry 60 when entering the first non-display region 0021. At least a part of the touch leads 20 can be arranged in the routing region ZQ, so that the touch lead 20 is led out from the display region 001 and then routed in the second direction x to the position of the pad 30. This can reduce line arrangement space in the first non-display region 0021, and facilitates narrowing of a frame.

As shown in FIG. 5, the signal line 50 includes a first signal line 51, the first signal line 51 is a partial line segment of the first touch lead 21, the first signal line 51 includes two endpoints, one endpoint is coupled to the first touch electrode 11 in the display region 001, and the other endpoint is coupled to the pad 30. It can be learned that a first touch lead 21-1 is coupled to the first touch electrode 11 in the display region 001, and extends in the display region 001 in the direction gradually close to the axis of symmetry 60 (referring to FIG. 3), extends out of the display region 001, and enters the first non-display region 0021. Optionally, the first touch electrode 11 coupled to the first touch lead 21-1 is the first touch electrode 11 located at an edge of the plurality of first touch electrodes 11 arranged in the second direction x. In this implementation, it is designed that at least a part of the first touch leads 21 are routed in the routing region ZQ in the display region 001, so that space occupied by the first touch lead 21 in the first non-display region can be reduced.

As shown in FIG. 5, the signal line 50 includes a second signal line 52, the second signal line 52 is a partial line segment of the second touch lead 22, the second signal line 52 includes two endpoints, one endpoint is coupled to the second touch electrode 12, and the other endpoint is coupled to the pad 30. One of the two endpoints of the second signal line 52 is a start point of the second signal line 52 in the display region 001, and the other endpoint is an end point of the second signal line 52 in the display region 001. As shown in FIG. 5, the second touch lead 22 is first routed in the non-display region 002 located on the side of the first corner G, enters the routing region ZQ in the display region 001, passes through the routing region ZQ, and then enters the first non-display region 0021. In this implementation, it is designed that at least a part of the second touch leads 22 are routed in the routing region ZQ in the display region 001, so that space occupied by the second touch lead 22 in the first non-display region can be reduced.

As shown in FIG. 5, a plurality of signal lines 50 are disposed side by side in the routing region ZQ, to ensure that the signal lines 50 are insulated from each other and arranged closely. This can reduce the space occupied by the touch lead 20 in the first non-display region 0021, and minimize the space occupied by the routing region ZQ in the display region 001.

In this embodiment of this application, a quantity and a type of signal lines 50 in the routing region ZQ may be set based on a requirement for narrowing a frame.

In some embodiments, at least one signal line 50 is included in the routing region ZQ, and the signal line 50 includes only a partial line segment of the first touch lead 21.

In some other embodiments, at least one signal line 50 is included in the routing region ZQ, and the signal line 50 includes only a partial line segment of the second touch lead 22.

Figure 6:
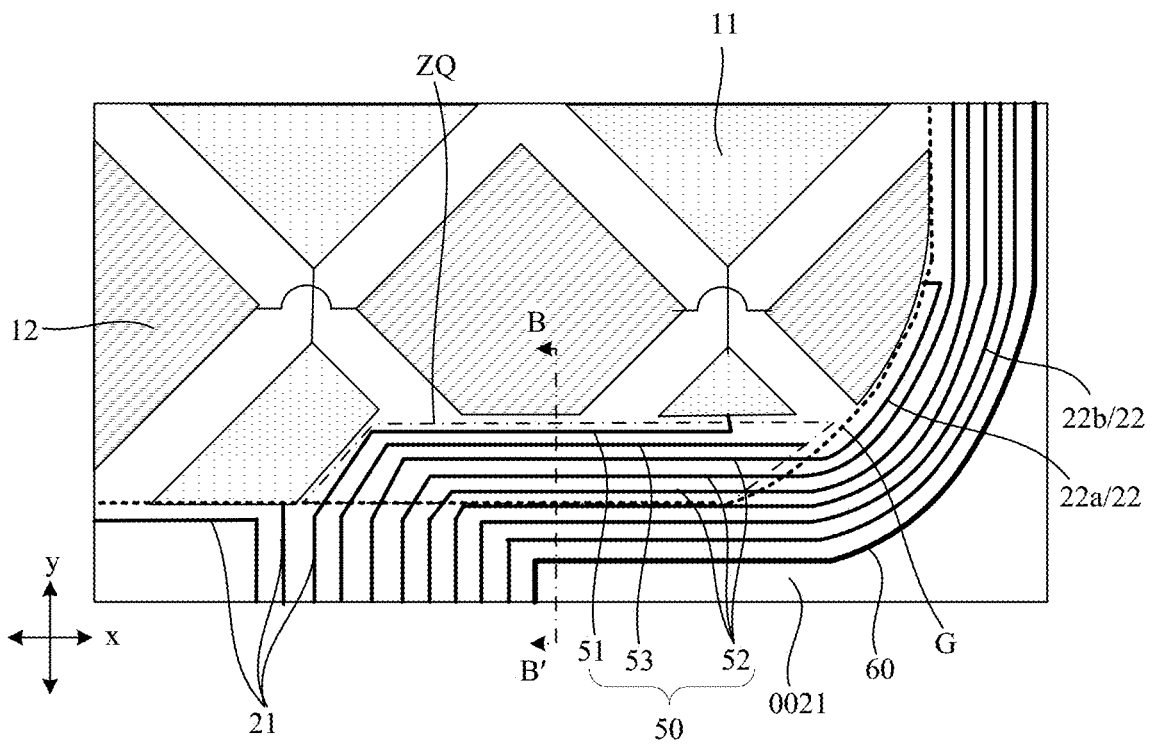
FIG. 6 is a local view of another display touch assembly according to an embodiment of this application.

In some embodiments, FIG. 6 is a local view of another display touch assembly according to an embodiment of this application. As shown in FIG. 6, a signal line 50 in a display region 001 includes a first signal line 51 and a second signal line 52. The first signal line 51 is a partial line segment of the first touch lead 21, and the second signal line 52 is a partial line segment of the second touch lead 22. The signal line 50 further includes a shielding line 53, and the shielding line 53 is located between the first signal line 51 and the second signal line 52. The shielding line 53 is configured to shield a signal, to prevent signal interference between the first signal line 51 and the second signal line 52, and ensure accuracy of touch detection.

In FIG. 6, that one shielding line 53 is disposed between the first signal line 51 and the second signal line 52 is used as an example. In some other embodiments, two or more shielding lines 53 are disposed between the first signal line 51 and the second signal line 52.

In some embodiments, the display touch assembly further includes a ground line. As shown in FIG. 6, the ground line 60 is located at a periphery of the touch lead 20.

In addition, as shown in the embodiment in FIG. 3, the display region 001 includes two first corners G, and two routing regions ZQs are disposed in the display region 001. In some embodiments, the display region 001 may include only one first corner G and one routing region ZQ based on different routing manners of the touch lead 20, that is, the routing region ZQ is disposed at only one corner position in two corners on the side that is of the display region 001 and that is close to the pad 30.

In some other embodiments, as shown in FIG. 6, the second touch lead 22 includes a first-type second touch lead 22a and a second-type second touch lead 22b. The first-type second touch lead 22a is routed in the non-display region 002 along an outer edge of the display region 001, extends to the display region 001 at the first corner G, passes through the routing region ZQ, and extends to the first non-display region 0021. The second-type second touch lead 22b is routed in the non-display region 002 along the outer edge of the display region 001, passes through the first corner G, and extends to the first non-display region 0021. In this application, both narrowing of the frame and impact of the routing region ZQ in the display region 001 on a touch are considered. On a side of the display touch assembly, a part of the second touch leads 22 are disposed to pass through the routing region ZQ and enter the first non-display region 0021, a remaining part of the second touch leads 22 still extend along the outer edge of the display region 001 and then enter the first non-display region 0021, so that space occupied by the second touch lead 22 in the first non-display region 0021 can be reduced. This facilitates narrowing of a frame, and avoids the following case: Touch performance at the first corner G is affected by excessively large space occupied by the signal line 50 in the display region 001.

For example, 22 touch leads 20 originally need to be disposed side by side in the first non-display region 0021, and a total width that needs to be occupied by the 22 touch leads 20 in the first direction y is 1.26 mm. A spacing between centers of two adjacent electrode blocks 10 in the display region 001 is approximately 4 mm. Based on a design in this embodiment of this application, a part of the touch leads 20 are disposed in the routing region ZQ in the display region 001 for routing, and a part of the touch leads 20 are still disposed outside the display region 001. For example, partial line segments of 12 of the 22 touch leads 20 are disposed in the display region 001 for routing, and 10 of the touch leads 20 are disposed outside the display region 001. In this case, a size (a length in the first direction y) occupied by the routing region ZQ in the display region 001 is approximately 12*0.058=0.696 mm. In this case, a ratio of the length of the routing region ZQ in the first direction y to a size of the electrode block 10 is 0.696/4=17.4%. In other words, even if a position originally used to dispose the electrode block 10 is partially disposed as the routing region ZQ, and the electrode block 10 has a partial loss, the electrode block 10 having a partial loss reserves more than 80% of an area. This can meet a range compatible with a touch algorithm, and almost does not affect touch effect at an edge.

In some embodiments, as shown in FIG. 5, the second touch lead 22 is disposed to be routed in the non-display region 002 along the edge of the display region 001, enters the routing region ZQ in the display region 001 at the first corner G, passes through the routing region ZQ, and enters the first non-display region 0021. In the embodiment in FIG. 5, it is shown that all lines that originally need to be disposed in the first non-display region 0021 and intersect the first direction x are disposed in the routing region ZQ, so that the space occupied by the touch lead 20 in the first non-display region 0021 can be greatly reduced. This facilitates narrowing of a frame.

In some embodiments, a material of the signal line 50 is the same as a material of the electrode block 10. The signal line 50 in the display region 001 and the electrode block 10 may be manufactured in a same etching process. This adds no new process, and can ensure flatness of the film layer at which the touch electrode is located.

In some embodiments, the electrode block 10 is made of a transparent material, for example, indium tin oxide.

In some other embodiments, the electrode block 10 is made of a metal material, for example, at least one of titanium, aluminum, silver, and copper. In an embodiment, the electrode block 10 is of a titanium-aluminum-titanium three-layer metal structure.

Figure 7:
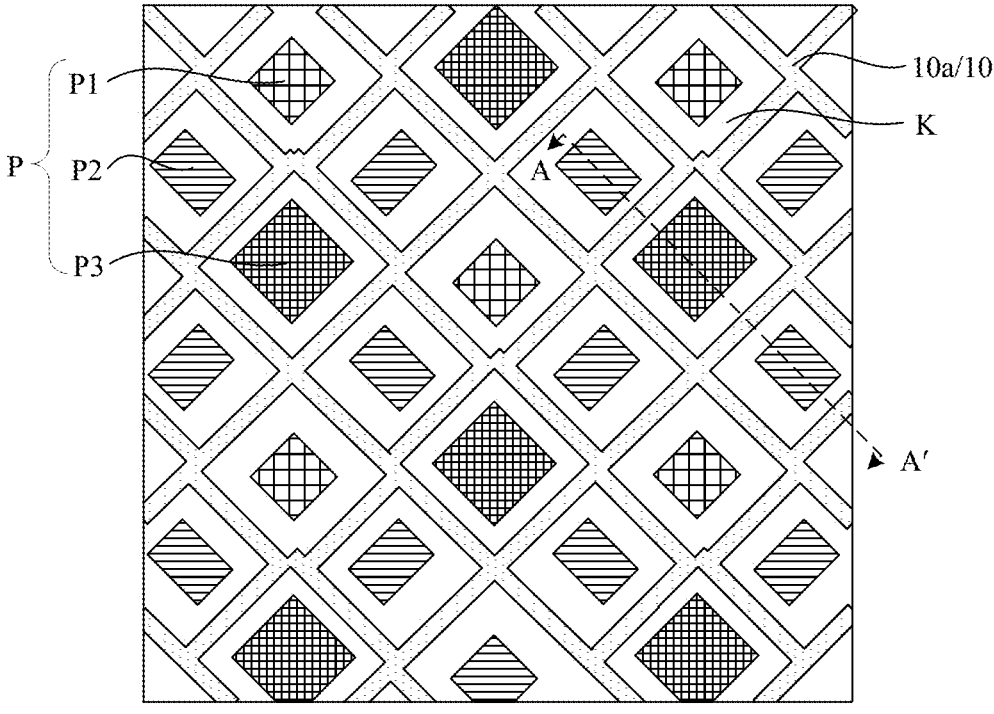
FIG. 7 is a diagram of another display touch assembly according to an embodiment of this application.
Figure 8:
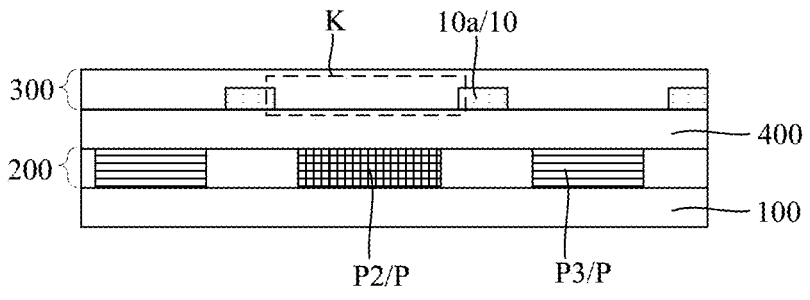
FIG. 8 is a sectional view along a section line A-A' in FIG. 7.

In some embodiments, FIG. 7 is a diagram of another display touch assembly according to an embodiment of this application. FIG. 8 is a sectional view along a section line A-A' in FIG. 7. FIG. 7 shows only a partial region of the first electrode block 10*a*. With reference to FIG. 7 and FIG. 8, the display touch assembly includes a substrate 100, and a display layer 200 and a touch layer 300 that are located on a side of the substrate 100. Both the electrode block 10 and the signal line 50 are located at the touch layer 300. The display layer 200 includes a plurality of pixels P. The electrode block 10 includes a plurality of openings K, and the opening K overlaps with the pixel P in a direction perpendicular to a plane in which the substrate 100 is located. The pixel P includes a first pixel P1, a second pixel P2, and a third pixel P3 whose light emitting colors are different from each other. The first pixel P1, the second pixel P2, and the third pixel P3 each are one of a red pixel, a green pixel, and a blue pixel. It can be learned from FIG. 7 that the electrode block 10 in this application is in a grid shape, and the opening K on the grid exposes the pixel P. Impedance on the touch electrode can be reduced by using the grid-shaped electrode block 10. In addition, the following case can be avoided: The touch electrode blocks light output of the pixel. It should be noted that an arrangement manner of the pixel P shown in FIG. 7 is merely an example, and is not intended to limit this application.

In some embodiments, the pixel P at the display layer 200 in this embodiment of this application includes an organic light-emitting diode, and a packaging layer 400 is further disposed between the display layer 200 and the touch layer 300. The packaging layer 400 is configured to isolate water and oxygen, to ensure a service life of the pixel P at the display layer 200. Optionally, the packaging layer 400 includes at least one inorganic layer and at least one organic layer.

Figure 9:
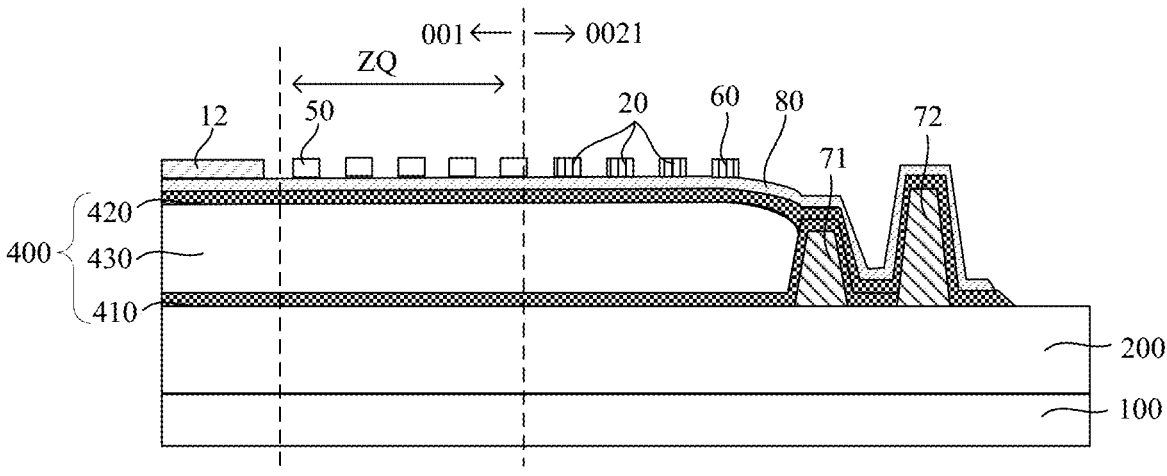
FIG. 9 is a sectional view along a section line B-B' in FIG. 6.

In some embodiments, FIG. 9 is a diagram of a sectional view along a section line B-B' in FIG. 6. As shown in FIG. 9, the packaging layer 400 includes a first inorganic layer 410, a second inorganic layer 420, and an organic layer 430 located between the two inorganic layers. A first baffle wall 71 and a second baffle wall 72 are disposed in the non-display region 0021, the first baffle wall 71 is configured to limit the organic layer 430, the first inorganic layer 410 extends to a side that is of the second baffle wall 72 and that is close to the first baffle wall 71, and the second inorganic layer 420 extends to an end that is of the second baffle wall 72 and that is away from the first baffle wall 71. As shown in FIG. 9, a partial line segment that is of the touch lead 20 and that intersects, in an extension direction of the first non-display region 0021, the first direction y is disposed between an edge of the display region 001 and an edge of the organic layer 430. That is, the partial line segment is disposed on the packaging layer 400 in the first non-display region 0021. Such a disposition can ensure a manufacturing yield rate of the touch lead 20 in the first non-display region 0021. Based on a design in this embodiment of this application, the partial line segment of the at least one touch lead 20 that originally needs to be routed in the first non-display region 0021 is disposed in the routing region ZQ of the display region 001. In this way, a quantity of touch leads 20 that are disposed side by side in the first non-display region 0021 and whose extension directions intersect the first direction y can be reduced, and space occupied by the touch leads 20 that are disposed side by side and whose extension directions intersect the first direction y can be reduced. In this way, a distance between an edge of the packaging layer 400 and the display region 001 can be reduced, and a frame can be narrowed.

As shown in FIG. 9, an insulation layer 80 is further disposed between the signal line 50 and the packaging layer 400, and the insulation layer 80 can protect a film layer structure below the signal line 50 and the electrode block 10 when the signal line 50 and the electrode block 10 are manufactured by using an etching process.

In some embodiments, after the display layer 200 and the packaging layer 400 are manufactured on the substrate 100, the touch layer 300 is manufactured by using a film forming process on a side that is of the packaging layer 400 and that is away from the substrate 100. For example, the touch layer 300 includes two metal layers: a first metal layer and a second metal layer. The second connection part 42 is located at the first metal layer, and the first connection part 41 and the electrode block 10 are located at the second metal layer. First, an inorganic insulation layer is manufactured on the packaging layer 400. The first metal layer is graphical, and the first metal layer is used as the second connection part 42. An insulation layer is manufactured, and a through hole is provided at the insulation layer to expose the second connection part 42. Then, the second metal layer is manufactured, where the second metal layer is configured to form the first electrode block 10*a*, the first connection part 41, and the second electrode block 10*b*, and the second electrode block 10*b* is connected to the second connection part 42 through the through hole at the insulation layer. A protection layer is manufactured after the process of the second metal layer. The protection layer may be an organic layer. In this embodiment of this application, the signal line 50 located in the routing region ZQ is located at the second metal layer, and the signal line 50, the first electrode block 10*a*, the first connection part 41, and the second electrode block 10*b* are manufactured in a same process.

Optionally, the touch lead 20 located in the non-display region 002 is designed by using a double-layer metal line, so that impedance on the touch lead 20 can be reduced. A first layer of line of the touch lead 20 located in the non-display region 002 is located at the first metal layer, and a second layer of line is located at the second metal layer. The first layer of line and the second connection part 42 are manufactured by using a same process at a same layer, and the second layer of line and the electrode block 10 are manu-factured by using a same process at a same layer.

In some embodiments, the pixel P at the display layer 200 provided in this embodiment of this application includes an inorganic light-emitting diode, for example, a mini LED or a micro LED.

In some embodiments, the display layer 200 provided in this embodiment of this application includes a color filter substrate, an array substrate, and a liquid crystal layer located between the color filter substrate and the array substrate.

Figure 10:
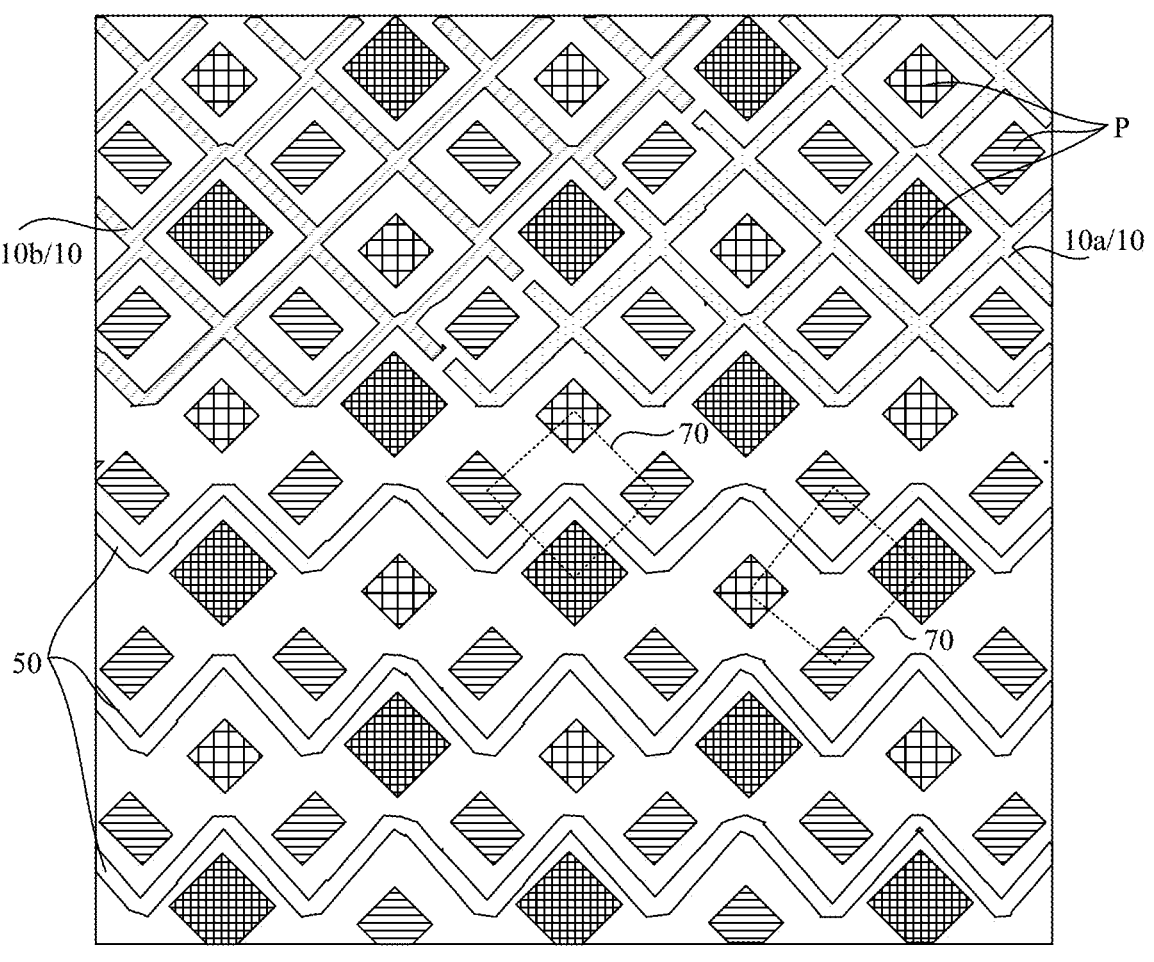
FIG. 10 is a local view of another display touch assembly according to an embodiment of this application.

In some embodiments, FIG. 10 is a local view of another display touch assembly according to an embodiment of this application. FIG. 10 is a top view of the display touch assembly, and FIG. 10 shows a part of a first electrode block 10*a* and a part of a second electrode block 10*b* in the display region 001. It can be learned from FIG. 10 that the signal line 50 is routed between adjacent pixels P, that is, an ortho-graphic projection of the signal line 50 onto the display layer 200 is located between the adjacent pixels P. In this case, the signal line 50 disposed in the display region 001 does not block light output of the pixel P.

As shown in FIG. 10, the signal line 50 is a polyline, a plurality of line segments are sequentially connected head to tail to form the polyline, and two connected line segments form a corner of the signal line 50. The corner of the signal line 50 is located in a virtual quadrilateral 70 formed by four adjacent pixels P. When both the first electrode block 10*a* and the second electrode block 10*b* are grid-shaped elec-trodes and are made of a metal material, the first electrode block 10*a* and the second electrode block 10*b* reflect ambi-ent light to some extent during application. In this applica-tion, the signal line 50 and the electrode block are at a same layer and made of a same material, and the signal line 50 is disposed between the adjacent pixels P for routing, so that a pattern formed by the signal line 50 in the routing region ZQ can be close to a pattern of a grid-shaped electrode at another position in the display region 001. In this way, reflectivity of the routing region ZQ to the ambient light is close to reflectivity of the position of the electrode block 10 to the ambient light. This reduces a risk that the routing region ZQ is observed by human eyes, and improves display uniformity of the display region 001 of the display touch assembly.

It should be noted that the virtual quadrilateral 70 includes connection lines between four geometric centers of four pixels P.

Figure 11:
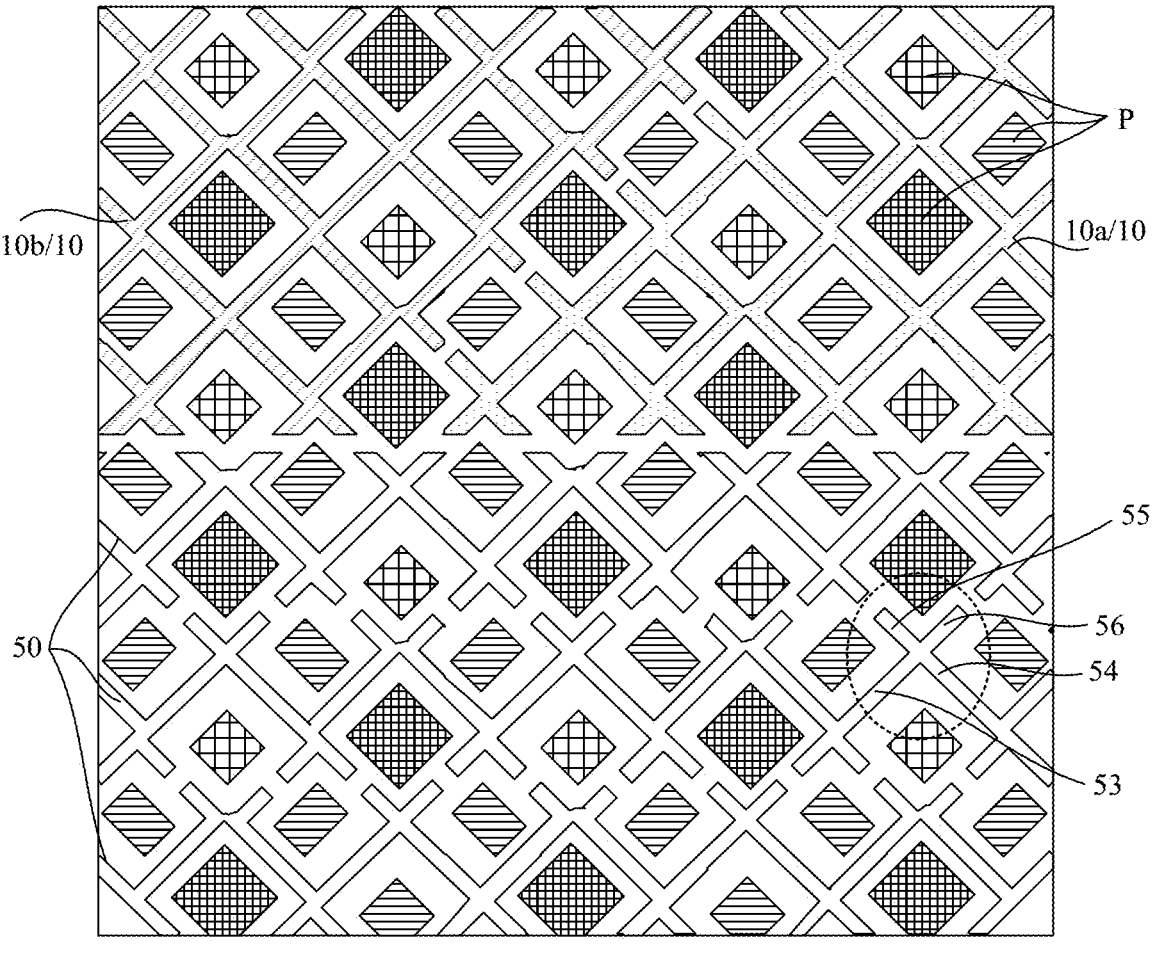
FIG. 11 is a local view of another display touch assembly according to an embodiment of this application.

In some embodiments, FIG. 11 is a local view of another display touch assembly according to an embodiment of this application. As shown in FIG. 11, the signal line 50 includes a first line segment 53 and a second line segment 54, the first line segment 53 and the second line segment 54 are con-nected to each other to form the corner, at least a part of corners of the signal line 50 have a first protrusion part 55 and a second protrusion part 56, the first protrusion part 55 protrudes from the corner in a direction away from the first line segment 53, and the second protrusion part 56 protrudes from the corner in a direction away from the second line segment 54. This implementation is equivalent to forming the signal line 50 after the grid-shaped electrode block 10 in the display region 001 is partially cut off. An overall pattern rule formed by the signal line 50 in the routing region ZQ is the same as a rule of the grid-shaped electrode block 10. Therefore, a reflection status of ambient light in the routing region ZQ is basically the same as a reflection status of ambient light at the position of the electrode block 10, and the routing region ZQ is unlikely to be observed by human eyes. This ensures display uniformity of the display region 001 of the display touch assembly.

Figure 12:
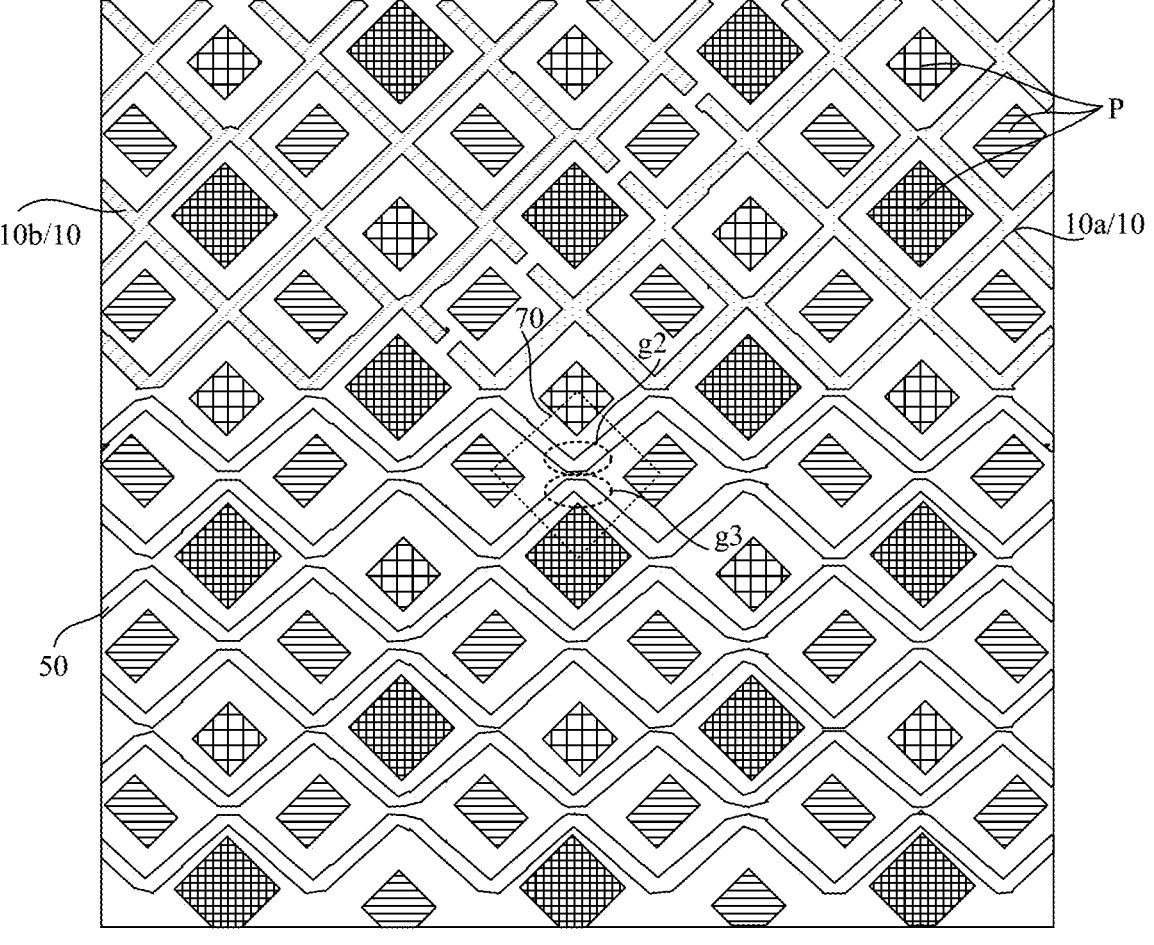
FIG. 12 is a local view of another display touch assembly according to an embodiment of this application.

In some embodiments, FIG. 12 is a local view of another display touch assembly according to an embodiment of this application. As shown in FIG. 12, for two adjacent signal lines 50, one signal line 50 includes a second corner g2, the other signal line 50 includes a third corner g3, and the second corner g2 and the third corner g3 are adjacent and located in a same virtual quadrilateral 70. In this implemen-tation, arrangement density of the signal line 50 can be increased, and when a quantity of signal lines 50 is fixed, an area of the display region 001 occupied by the routing region ZQ can be reduced, so that impact of a disposition of the routing region ZQ on the touch electrode array in the display region 001 can be reduced.

Figure 13:
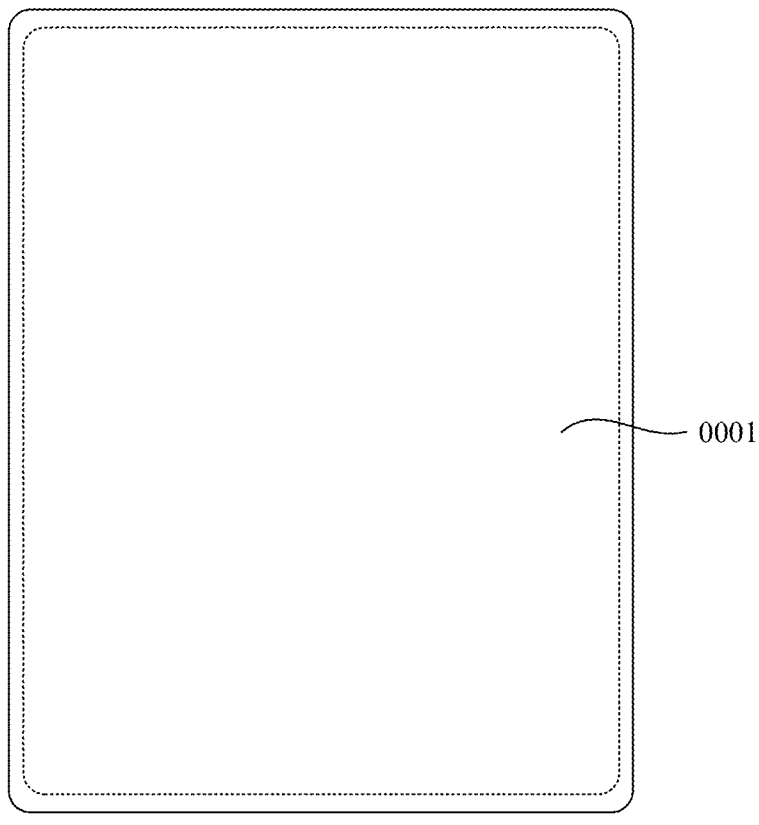
FIG. 13 is a diagram of a display apparatus according to an embodiment of this application.

Based on a same inventive concept, an embodiment of this application further provides a display apparatus. FIG. 13 is a diagram of a display apparatus according to an embodi-ment of this application. As shown in FIG. 13, the display apparatus includes the display touch assembly 0001 pro-vided in any embodiment of this application. A structure of the display touch assembly 0001 is described in the fore-going embodiments, and details are not described herein again. The display apparatus provided in embodiments of the present invention is any device having a display func-tion, for example, a mobile phone, a tablet computer, a notebook computer, a television, or a smartwatch.

The foregoing descriptions are merely specific implemen-tations of the present invention, but are not intended to limit the protection scope of the present invention. Any variation or replacement readily figured out by a person skilled in the art within the technical scope disclosed in the present invention shall fall within the protection scope of the present invention.

The invention claimed is:

1. A display touch assembly, wherein the display touch assembly comprises:

a plurality of electrode blocks arranged in an array, wherein the electrode blocks comprise a plurality of first electrode blocks and a plurality of second electrode blocks, the plurality of first electrode blocks are arranged in a first direction to form a first touch electrode, a plurality of first touch electrodes are arranged in a second direction, the second direction intersects the first direction, adjacent first electrode blocks are coupled through a first connection part, the plurality of second electrode blocks are arranged in the second direction to form a second touch electrode, a plurality of second touch electrodes are arranged in the first direction, adjacent second electrode blocks are coupled through a second connection part, and the second connection part intersects the first connection part in an insulated manner;

a plurality of touch leads and a plurality of pads, wherein in the first direction, the plurality of pads are located on a side of the plurality of electrode blocks, the touch leads are coupled to the pads, the touch leads comprise a first touch lead and a second touch lead, an end of the first touch electrode in the first direction is coupled to the first touch lead, and an end of the second touch electrode in the second direction is coupled to the second touch lead;

a display layer comprising pixels; and a display region and a non-display region, the plurality of electrode blocks are located in the display region, the plurality of pads are located in the non-display region, the display region comprises a first corner, and the first corner is located at an end of the display region close to the pad, wherein the display region comprises a routing region adjacent to the first corner, signal lines are disposed in the routing region, wherein for each signal line of the signal lines, a routing direction of the signal line intersects the first direction, and the signal line comprises a partial line segment of at least one touch lead, and wherein for two adjacent signal lines of the signal lines, one signal line comprises a second corner, the other signal line comprises a third corner, and the second corner and the third corner are adjacent and located in a virtual quadrilateral formed by four adjacent pixels of the pixels.

2. The display touch assembly according to claim 1, wherein the signal line comprises at least one of a first signal line or a second signal line, the first signal line is a partial line segment of the first touch lead, the first signal line comprises two endpoints, one endpoint is coupled to the first touch electrode in the display region, and the other endpoint is coupled to the pad, the second signal line is a partial line segment of the second touch lead, the second signal line comprises two endpoints, one endpoint is coupled to the second touch electrode, and the other endpoint is coupled to the pad.

3. The display touch assembly according to claim 2, wherein
the signal line comprises at least one shielding line, and the shielding line is located between the first signal line and the second signal line.

4. The display touch assembly according to claim 1, wherein
the signal line overlaps with neither the first touch electrode nor the second touch electrode.

5. The display touch assembly according to claim 1, wherein the display touch assembly further comprises:
a substrate, the electrode block and the signal line are located on a side of the display layer away from the substrate; and
an orthographic projection of the signal line onto the display layer is located between adjacent pixels.

6. The display touch assembly according to claim 5, wherein
the signal line is a polyline, and a corner of the signal line is located in the virtual quadrilateral.

7. The display touch assembly according to claim 6, wherein
the signal line comprises a first line segment and a second line segment, the first line segment and the second line segment are connected to each other to form the corner, at least a part of corners of the signal line have a first protrusion part and a second protrusion part, the first protrusion part protrudes from the corner in a direction away from the first line segment, and the second protrusion part protrudes from the corner in a direction away from the second line segment.

8. The display touch assembly according to claim 1, wherein
a material of the signal line is same as a material of the electrode block.

9. The display touch assembly according to claim 1, wherein
the display region has an axis of symmetry extending in the first direction;
a plurality of signal lines are disposed side by side in the routing region; and the signal line comprises two endpoints, and in the second direction, distances from the two endpoints of the signal line to the axis of symmetry are unequal.

10. The display touch assembly according to claim 1, wherein the display touch assembly further comprises:
a substrate and a display layer, the electrode block and the signal line are located on a side of the display layer away from the substrate, and the display layer comprises a plurality of pixels;
the electrode block comprises a plurality of openings; and
in a direction perpendicular to a plane in which the substrate is located, the opening overlaps with the pixel.

11. The display touch assembly according to claim 1, wherein the virtual quadrilateral comprises connection lines between four geometric centers of the four adjacent pixels.

12. A display apparatus, comprising a display touch assembly, wherein the display touch assembly comprises:
a plurality of electrode blocks arranged in an array, wherein the electrode blocks comprise a plurality of first electrode block and a plurality of second electrode blocks, the plurality of first electrode blocks are arranged in a first direction to form a first touch electrode, a plurality of first touch electrodes are arranged in a second direction, the second direction intersects the first direction, adjacent first electrode blocks are coupled through a first connection part, the plurality of second electrode blocks are arranged in the second direction to form a second touch electrode, a plurality of second touch electrodes are arranged in the first direction, adjacent second electrode blocks are coupled through a second connection part, and the second connection part intersects the first connection part in an insulated manner;
a plurality of touch leads and a plurality of pads, wherein in the first direction, the plurality of pads are located on a side of the plurality of electrode blocks, the touch leads are coupled to the pads, the touch leads comprise a first touch lead and a second touch lead, an end of the first touch electrode in the first direction is coupled to the first touch lead, and an end of the second touch electrode in the second direction is coupled to the second touch lead;
a display layer comprising pixels; and
a display region and a non-display region, the plurality of electrode blocks are located in the display region, the plurality of pads are located in the non-display region, the display region comprises a first corner, and the first corner is located at an end of the display region close to the pad, wherein the display region comprises a routing region adjacent to the first corner, signal lines are disposed in the routing region, wherein for each signal line of the signal lines, a routing direction of the signal line intersects the first direction, and the signal line comprises a partial line segment of at least one touch lead, and wherein for two adjacent signal lines of the signal lines, one signal line comprises a second corner, the other signal line comprises a third corner, and the second corner and the third corner are adjacent and located in a virtual quadrilateral formed by four adjacent pixels of the pixels.

13. The display apparatus according to claim 12, wherein the signal line comprises at least one of a first signal line or a second signal line, the first signal line is a partial line segment of the first touch lead, the first signal line comprises two endpoints, one endpoint is coupled to the first touch electrode in the display region, and the other endpoint is coupled to the pad, the second signal line is a partial line segment of the second touch lead, the second signal line comprises two endpoints, one endpoint is coupled to the second touch electrode, and the other endpoint is coupled to the pad.

14. The display apparatus according to claim 13, wherein the signal line comprises at least one shielding line, and the shielding line is located between the first signal line and the second signal line.

15. The display apparatus according to claim 12, wherein the signal line overlaps with neither the first touch electrode nor the second touch electrode.

16. The display apparatus according to claim 12, wherein the display touch assembly further comprises:

a substrate, the electrode block and the signal line are located on a side of the display layer away from the substrate; and an orthographic projection of the signal line onto the display layer is located between adjacent pixels.

17. The display apparatus according to claim 16, wherein the signal line is a polyline, and a corner of the signal line is located in the virtual quadrilateral.

18. The display apparatus according to claim 17, wherein the signal line comprises a first line segment and a second line segment, the first line segment and the second line segment are connected to each other to form the corner, at least a part of corners of the signal line have a first protrusion part and a second protrusion part, the first protrusion part protrudes from the corner in a direction away from the first line segment, and the second protrusion part protrudes from the corner in a direction away from the second line segment.

19. The display apparatus according to claim 12, wherein the display region has an axis of symmetry extending in the first direction;

a plurality of signal lines are disposed side by side in the routing region; and the signal line comprises two endpoints, and in the second direction, distances from the two endpoints of the signal line to the axis of symmetry are unequal.

20. The display apparatus according to claim 12, wherein the virtual quadrilateral comprises connection lines between four geometric centers of the four adjacent pixels.

* * * * *